May 3, 1966     B. C. LIEBENTHAL     3,249,841
DYNAMIC BRAKE SYSTEM
Filed July 11, 1963
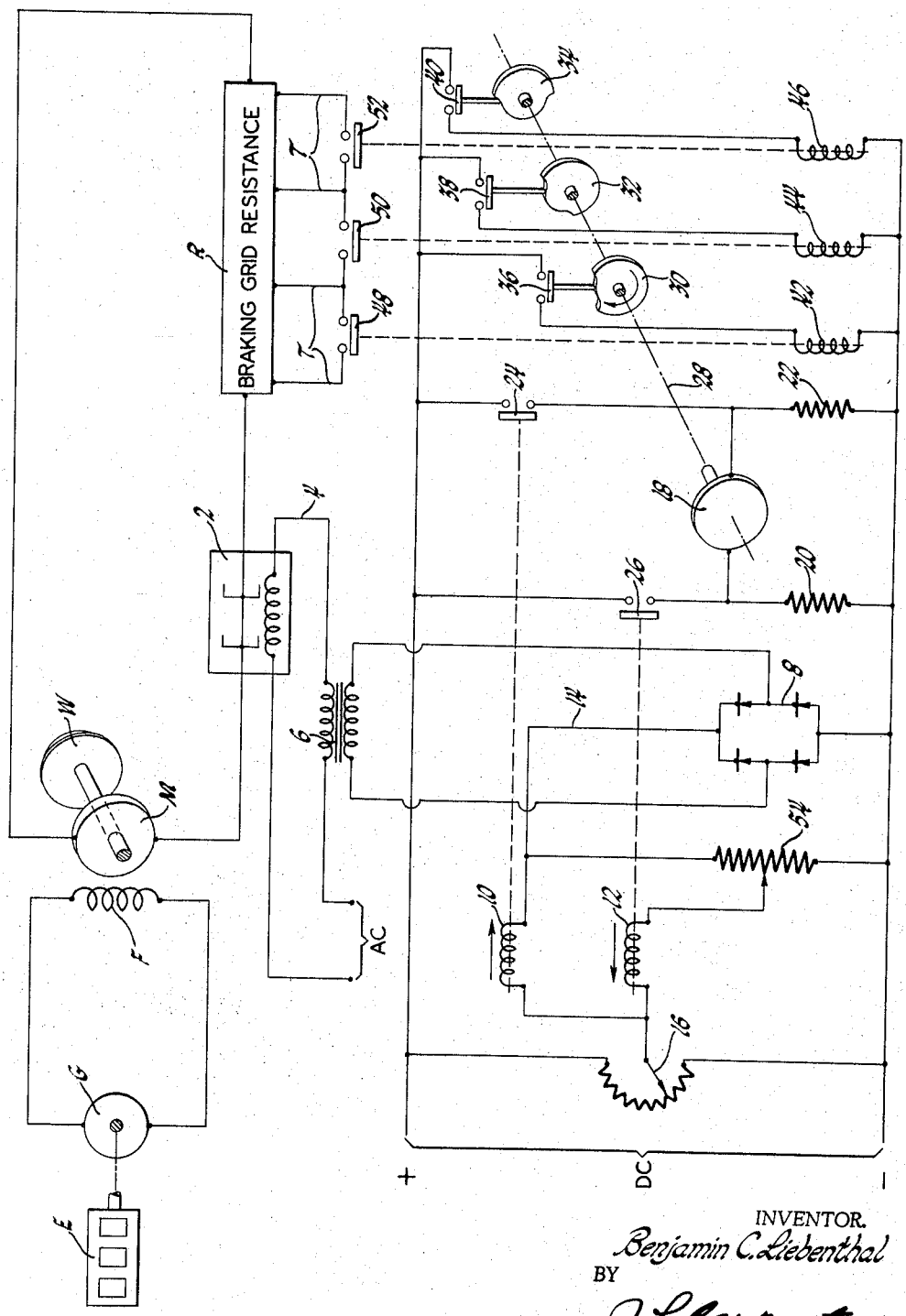
INVENTOR.
Benjamin C. Liebenthal
BY
J. L. Carpenter
ATTORNEY United States Patent Office 3,249,841
Patented May 3, 1966

3,249,841
DYNAMIC BRAKE SYSTEM
Benjamin C. Liebenthal, La Grange, Ill., assignor to General Motors Corporation, Detroit, Mich., a corporation of Delaware
Filed July 11, 1963, Ser. No. 294,344
3 Claims. (Cl. 318—367)

This invention relates to dynamic braking systems and particularly to such systems for use in conjunction with diesel electric locomotives.

It is well known that in diesel locomotives the traction motors which are used to propel the locomotive along the rails may also be used to dynamically brake the locomotive.

In normal power operation of a locomotive a diesel engine is utilized to drive a main generator which supplies electrical power to the traction motors geared to the locomotive wheels. In dynamic braking the traction motors are re-connected across dynamic braking resistances called grids as separately excited generators. The fields of the motors are connected in series across the main generator. The motor armatures are loaded on the fixed grid resistors and the torque required to drive the armatures is derived from the motion of the train along the rails. The locomotive operator when utilizing dynamic braking in conventional dynamic brake systems is provided with a dynamic brake control which he operates to select at a given locomotive speed a predetermined magnitude of dynamic brake braking effort. It will be apparent, however, that as the locomotive slows down or speeds up, this braking effort becomes less or greater since it is a function of locomotive speed, i.e., traction motor speed.

The present invention has as its primary objective to maintain the selected dynamic braking effort substantially constant through a predetermined range of locomotive speeds.

For a fuller understanding of the invention and the above and other objectives thereof, reference may be made to the accompanying drawing which is a simplified schematic of the proposed dynamic brake system.

Referring now to the drawing, a locomotive diesel engine indicated by the letter E is shown operatively coupled to a main generator G. The generator G which is suitably excited is adapted to supply electrical energy to a winding F of a traction motor whose armature is indicated by the letter M. The armature M of the traction motor has operatively connected thereto a set of wheels indicated diagrammatically in the drawing by the letter W. Connected across the motor armature M is a dynamic braking grid resistance indicated in general by the letter R. The braking resistance R is provided with a series of taps T to shunt out portions thereof in a manner to be described more fully shortly. In circuit with the dynamic braking grid resistance R across the motor armature M is a transductor 2 which senses the magnitude of the current flow through the dynamic braking grid resistance R and motor armature M and superimposes it as a signal upon a low voltage A.C. circuit 4 which includes a voltage transformer 6. The output of transformer 6 is fed to a full wave rectifier 8 where it is rectified and applied as a voltage reflective of motor armature current to a pair of directional relays 10 and 12 via electrical conductor 14. The rectified voltage of rectifier 8 at which directional relays 10 and 12 will pick up is determined by the locomotive engineer's selector control indicated generally by numeral 16. This control is in effect a potentiometer and is connected across a direct current voltage source indicated by the letters D.C. Also connected across this direct current voltage source D.C. is a permanent magnet type program switch motor armature 18 and resistors 20 and 22 in circuit across the D.C. source and in circuit with the normally open interlocks 24 and 26 of directional relays 10 and 12, respectively.

The armature 18 of the program switch has mounted on or coupled to its shaft 28 a plurality of cam wafers 30, 32 and 34. These wafers 30, 32 and 34 are provided with cam surfaces to operate the interlocks 36, 38 and 40, respectively. The interlocks 36, 38 and 40 control energization of windings of three relays 42, 44 and 46 whose respective interlocks 48, 50 and 52 when closed shunt portions of dynamic braking resistor grid R by means of the taps T previously mentioned.

The operation of the system is as follows: Let it be assumed the operator (locomotive engineer) has selected a value of dynamic brake effort by moving control 16 to some suitable position such as indicated in the drawing. Depending on locomotive speed a certain dynamic brake current will flow in the dynamic brake circuit which includes the motor armature M and brake resistance R. The transductor 2, as already mentioned, will sense the magnitude of this current and via the A.C. circuit which includes the transductor 2 and transformer 6 will apply it as an A.C. voltage to rectifier 8. This A.C. voltage is rectified and applied as a D.C. voltage to the directional relays 10 and 12 in opposition to the voltage applied to these two relays by the D.C. voltage source D.C. through the operator's potentiometer control 16. Since these relays 10 and 12 are directional, depending on whether the voltage applied by the potentiometer or the rectifier 8 is sufficiently greater, one or the other of these relays will become sufficiently energized to pick up.

Let it be assumed that the voltage applied by the rectifier 8 (reflective of dynamic brake grid current) is less by at least 1 volt (the voltage at which relays 10 and 12 have been calibrated to pick up). In such case relay 10 will pick up by current flow in the direction of relay pick-up (direction of arrow over relay). Pick-up of relay 10 causes its interlock 24 to close energizing program switch motor 18 with its winding 22 being dominant to give it a clockwise rotation. Clockwise rotation of shaft 18 and wafers 30, 32 and 34 will first close interlock 36 of wafer 30. Closure of interlock 36 energizes its associated relay 42 and causes interlock 48 to close. Closure of interlock 48 will shunt out part of resistance R by one of the shunts T. Shunting out part of resistance R causes the dynamic brake current to increase thus increasing braking effort since the braking effort or torque is reflected by current flow through armature M.

The above cycle will be repeated with respect to wafers 32 and 34 shunting out more resistance R until the braking effort for a predetermined locomotive speed becomes that determined by the control 16.

When the braking effort current causes a signal to be applied through transductor 2, transformer 6 and rectifier 8 to relays 10 and 12 which in conjunction with the setting of control 16 causes a voltage differential of less than 1 volt to be applied to relays 10 and 12, the relays remain de-energized and the dynamic brake system is in substantially a balanced condition. Naturally, however, as dynamic braking effort is applied to the locomotive (depending on grade conditions) it tends to slow down. This results in slower turning of the armature M of the traction motor and less braking current (braking effort). As soon as this current droops sufficiently to create a voltage differential of more than 1 volt on relays 10 and 12 with the control 16 applying the larger voltage, relay 10 will again pick up and, again by means of the program switch motor 18, cut out resistance R until the braking current builds back up. The above continues to happen as the locomotive slows down.

Let it be assumed now that the locomotive (and train) is operating on a grade where it tends to gain speed. In such case the effort within a predetermined range (depending on values of resistance R, amounts of R shunted, number of wafers, etc.) will be maintained by this unique system in the reverse manner from that described above for decreases in speed. In such case when the voltage differential applied to relays 10 and 12 is greater than 1 volt, but with the voltage from rectifier 8 (reflective of braking current) being greater, relay 12 will now pick up. (Relay 12 being directional picks up only upon a sufficient voltage differential causing a current flow through the winding thereof in the direction of the arrow located thereabove on the drawing.) Relay 10 remains de-energized. Under the condition assumed immediately above, pick up of relay 12 causes its interlock 26 to close energizing program switch motor 18 with its winding 20 being dominant to impart counterclockwse rotaton to motor 18 and shaft 28. Such counterclockwise rotation of shaft 18 will cause opening of the interlock 40 associated with wafer 34 (assuming all interlocks 36, 38 and 40 have been closed as previously described). Opening of interlock 40 will de-energize relay 46 and thus increase the resistance R across motor armature to thereby reduce the braking effort to the preselected value determined by control 16. The above cycle will repeat itself with respect to wafers 32 and 30, relays 44 and 42, and interlocks 50 and 48 to continue adding resistance R at any time the voltage differential applied to relay 12 is greater than 1 volt with the rectifier 8 applying the greater voltage.

It will be appreciated that while only three shunts and three wafers for the program switch have been shown any number thereof could be selected to make the system and control as sensitive as desired in maintaining preselected dynamic braking effort substantially the same through a wide range of locomotive speeds. Alternatively, a sliding tap could be applied to R to be controlled by the program switch.

It is important to emphasize at this point that this dynamic brake control is highly flexible inasmuch as it tends to maintain a *preselected* dynamic brake effort substantially constant. In other words, any dynamic brake effort within a predetermined range may be selected and the control will automatically tend to maintain such effort substantially constant within such range. This has the effect of greatly extending the range of dynamic braking previously available with conventional dynamic brake systems.

While only one traction motor and a single resistance R have been shown to simplify illustration and understanding of the invention, the invention is readily applicable to the usual locomotive which includes a plurality of such motors and grids. Resistance 54 is merely a calibrating resistor for relays 10 and 12.

I claim:

1. A dynamic brake system comprising an electrical machine including a variably driven armature and a field winding, means for energizing said winding, a dynamic brake resistance connected across the armature of said machine for dissipating in the form of heat the energy generated thereby, manually operable means to select a predetermined value of dynamic braking current flow through said armature, and means responsive to the current flow through said armature to vary the magnitude of said resistance and automatically maintain said current substantially constant for a predetermined range of armature speeds, said last mentioned means including a pair of oppositely polarized relays, a potentiometer circuit controlled by said manually operable means to apply a voltage to said polarized relays, and a transductor in circuit with said motor armature to apply a voltage reflective of motor armature current to said relays in opposition to the voltage applied thereto by said potentiometer circuit, one of said relays being responsive to a predetermined voltage differential between the voltages applied thereto wherein said potentiometer voltage is the dominant voltage to decrease the magnitude of said resistance, the other of said relays being responsive to a predetermined voltage differential between the voltages applied thereto wherein said transductor voltage is the dominant voltage to increase the magnitude of said resistance.

2. A locomotive dynamic brake system comprising a locomotive traction motor operating as a generator having an exciting winding and an armature driven by wheels of the locomotive, means to energize said winding, a dynamic brake resistance connected across said motor armature for dissipating in the form of heat the energy generated by rotation thereof, manually operable means to select a predetermined value of dynamic braking current flow through said armature, and means responsive to the current flow through said armature to vary the magnitude of said resistance and automatically maintain said current substantially constant for a predetermined range of locomotive speeds during braking, said last mentioned means including a pair of oppositely polarized relays, a potentiometer circuit controlled by said manually operable means to apply a voltage to said polarized relays, and a transductor in circuit with said motor armature to apply a voltage reflective of motor armature current to said relays in opposition to the voltage applied thereto by said potentiometer circuit, one of said relays being responsive to a predetermined voltage differential between the voltages applied thereto wherein said potentiometer voltage is the dominant voltage to decrease the magnitude of said resistance, the other of said relays being responsive to a predetermined voltage differential between the voltages applied thereto wherein said transductor voltage is the dominant voltage to increase the magnitude of said resistance.

3. A locomotive dynamic brake system comprising an engine driven main generator, a locomotive traction motor operating as a generator driven by wheels of the locomotive, excitation means for said motor energized by the output of said generator, a dynamic brake resistance connected across said motor for dissipating in the form of heat the energy generated thereby, manually operable means to select a predetermined value of dynamic braking current flow through said armature, and means responsive to the current flow through said motor to vary the magnitude of said resistance and automatically maintain said current substantially constant for a predetermined range of locomotive speeds during braking, said last mentioned means including a pair of oppositely polarized relays, a potentiometer circuit controlled by said manually operable means to apply a voltage to said polarized relays, and a transductor in circuit with said motor armature to apply a voltage reflective of motor armature current to said relays in opposition to the voltage applied thereto by said potentiometer circuit, one of said relays being responsive to a predetermined voltage differential between the voltages applied thereto wherein said potentiometer voltage is the dominant voltage to decrease the magnitude of said resistance, the other of said relays being responsive to a predetermined voltage differential between the voltages applied thereto wherein said transductor voltage is the dominant voltage to increase the magnitude of said resistance.

References Cited by the Examiner

UNITED STATES PATENTS

| | | | |
|---|---|---|---|
| 2,342,754 | 2/1944 | Purifoy | 318—367 |
| 2,342,756 | 2/1944 | Riley | 318—367 X |
| 2,565,118 | 8/1951 | Binney et al. | |
| 2,627,597 | 2/1953 | Johansson | 318—367 X |

ORIS L. RADER, *Primary Examiner.*

J. C. BERENZWEIG, *Assistant Examiner.*